US012576692B2

(12) United States Patent
Verma et al.

(10) Patent No.: US 12,576,692 B2
(45) Date of Patent: Mar. 17, 2026

(54) THERMAL MANAGEMENT CONTROL SYSTEMS AND METHODS

(71) Applicant: Transportation IP Holdings, LLC, Norwalk, CT (US)

(72) Inventors: Rajeev Verma, Bangalore (IN); Venkateswara Reddy Maram, Bangalore (IN); Vinay Ramu, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/734,929

(22) Filed: Jun. 5, 2024

(65) Prior Publication Data

US 2024/0399823 A1    Dec. 5, 2024

Related U.S. Application Data

(60) Provisional application No. 63/506,164, filed on Jun. 5, 2023.

(51) Int. Cl.
*B60H 1/00* (2006.01)
*F25B 49/02* (2006.01)

(52) U.S. Cl.
CPC ..... *B60H 1/00885* (2013.01); *B60H 1/00807* (2013.01); *B60H 1/00985* (2013.01); *F25B 49/022* (2013.01); *F25B 2500/08* (2013.01); *F25B 2500/26* (2013.01); *F25B 2700/21152* (2013.01)

(58) Field of Classification Search
CPC ..................... F25B 49/022; F25B 2700/21152
See application file for complete search history.

(56) References Cited

U.S. PATENT DOCUMENTS

2008/0148827 A1* 6/2008 Keski-Hynnila ..... G01M 15/05
                                                             73/114.74
2017/0021700 A1* 1/2017 Smith .................. B60H 1/3225

* cited by examiner

*Primary Examiner* — Ngoc T Nguyen
(74) *Attorney, Agent, or Firm* — K&L Gates LLP

(57) ABSTRACT

A system and a method include monitoring a discharge temperature of a compressor of a powered system while the compressor is in an unpowered state, and changing the state of the compressor from the unpowered state to an unloaded powered state to start operation of the compressor responsive to the discharge temperature of the compressor reaching a first temperature threshold. The discharge temperature of the compressor is monitored for a first length of time while the compressor operates in the unloaded powered state. The state of the compressor is changed from the unloaded powered state to a loaded powered state responsive to the discharge temperature being within a first temperature range for the first length of time.

20 Claims, 4 Drawing Sheets

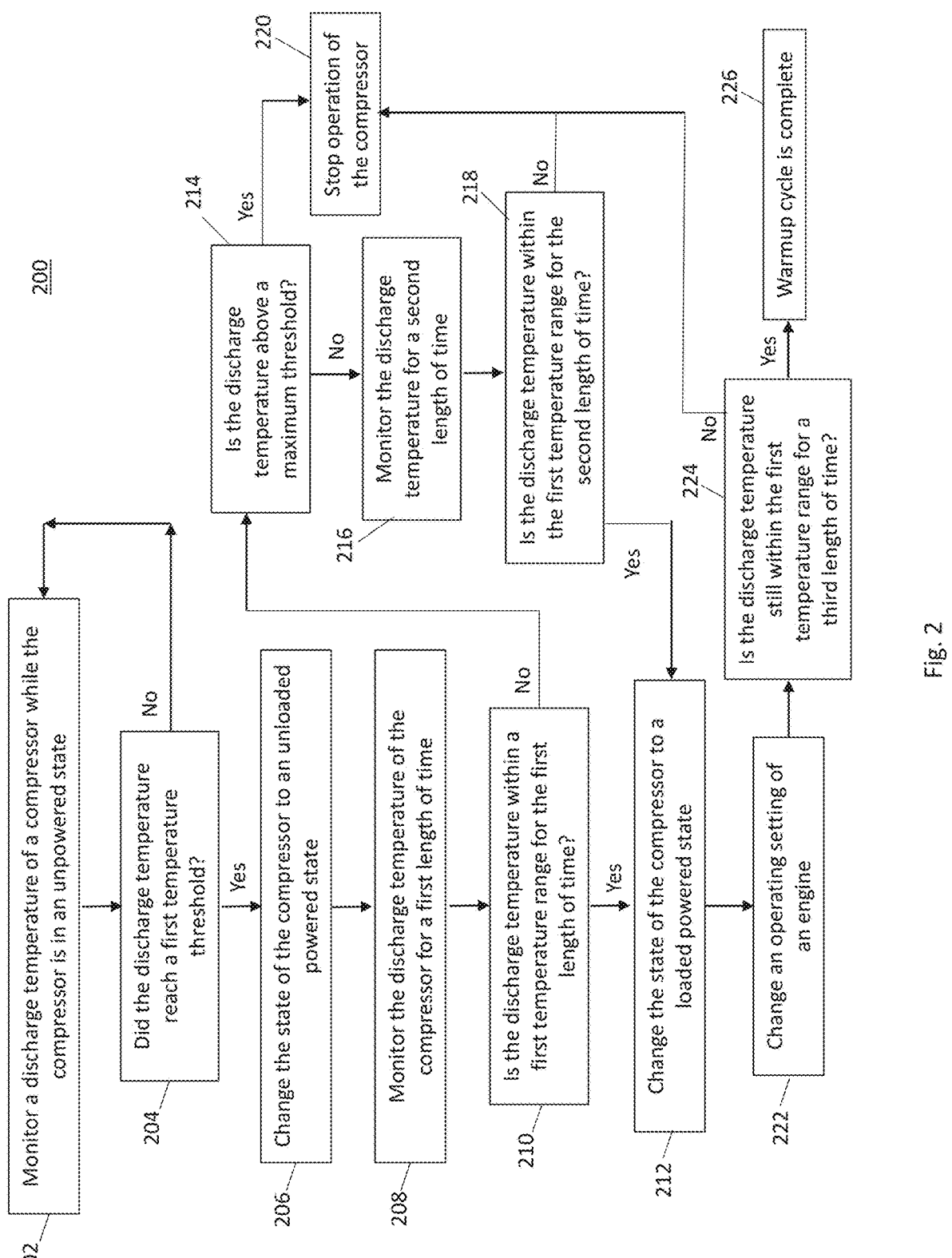

200

202 — Monitor a discharge temperature of a compressor while the compressor is in an unpowered state 204 — Did the discharge temperature reach a first temperature threshold?

No

Yes

206 — Change the state of the compressor to an unloaded powered state

208 — Monitor the discharge temperature of the compressor for a first length of time 210 — Is the discharge temperature within a first temperature range for the first length of time?

No

Yes

212 — Change the state of the compressor to a loaded powered state

222 — Change an operating setting of an engine

214 — Is the discharge temperature above a maximum threshold?

Yes

No

220 — Stop operation of the compressor

216 — Monitor the discharge temperature for a second length of time

218 — Is the discharge temperature within the first temperature range for the second length of time?

No

Yes

224 — Is the discharge temperature still within the first temperature range for a third length of time?

No

Yes

226 — Warmup cycle is complete

Fig. 2

THERMAL MANAGEMENT CONTROL SYSTEMS AND METHODS

CROSS-REFERENCE TO RELATED APPLICATIONS

This application claims benefit under 35 U.S.C. § 119(e) to U.S. Provisional Application No. 63/506,164, filed Jun. 5, 2023, entitled "THERMAL MANAGEMENT CONTROL SYSTEMS AND METHODS," the entire disclosure of which is hereby incorporated by reference herein.

BACKGROUND

Technical Field

The subject matter described herein relates to thermal management control systems and methods of powered systems, such as vehicle systems (formed from single or multiple vehicles) or non-vehicle powered systems.

Discussion of Art

Powered systems, such as vehicle systems, include heat exchanger systems that control temperatures of compressed air and/or other fluids that are used to power the powered systems. As one example, a heat exchanger may reduce thermal energy of compressed discharge air and oil. However, a clogged heat exchanger may fail to sufficiently cool the compressor oil and/or compressed air, leading to a compressor that may overheat, causing the powered system to fail.

In certain instances, the manner in which the compressor (and other systems of the powered system) are warmed up can lead to clogging of the heat exchanger and overheating of the compressor. In other instances, monitoring the powered system, such as compressor discharge fluids during the warmup of the compressor, may indicate whether the compressor and/or heat exchanger are operating correctly, if the heat exchanger is clogged (e.g., beyond an acceptable limit), or the like. However, a procedure for monitoring the powered system during a warmup cycle of the powered system does not presently exist.

It may be desirable to have a warmup procedure that monitors the powered system during a warmup cycle of the powered system, and monitors the powered system during normal operation of the powered system, which differs from those that are currently available.

BRIEF DESCRIPTION

In accordance with one example or aspect, a method includes monitoring a discharge temperature of a compressor of a powered system while the compressor is in an unpowered state, and changing the state of the compressor from the unpowered state to an unloaded powered state to start operation of the compressor responsive to the discharge temperature of the compressor reaching a first temperature threshold. The discharge temperature of the compressor is monitored for a first length of time while the compressor operates in the unloaded powered state. The state of the compressor is changed from the unloaded powered state to a loaded powered state responsive to the discharge temperature being within a first temperature range for the first length of time.

In accordance with one example or aspect, a system includes one or more sensors that sense a discharge temperature of a compressor of a powered system while the compressor is in an unpowered state. One or more processors control operation of the compressor to change the state of the compressor from the unpowered state to an unloaded powered state to start operation of the compressor responsive to the discharge temperature of the compressor reaching a first temperature threshold. The one or more processors monitor the discharge temperature of the compressor for a first length of time while the compressor operates in the unloaded powered state, and the processors change the state of the compressor from the unloaded powered state to a loaded powered state responsive to the discharge temperature being within a first temperature range for the first length of time.

In accordance with one example or aspect, a method for controlling operation of a compressor of a powered system includes monitoring a discharge temperature of a compressor of a powered system while the compressor is in an unpowered state. A state of the compressor is changed from the unpowered state to an unloaded powered state to start operation of the compressor responsive to the discharge temperature of the compressor reaching a first temperature threshold. The discharge temperature of the compressor is monitored for a first length of time while the compressor operates in the unloaded powered state. A determination is made whether the discharge temperature is outside a first temperature range for the first length of time. An operating setting of the powered system is changed responsive to the discharge temperature being outside of the first temperature range for the first length of time. The discharge temperature is monitored for a second length of time, and the state of the compressor is changed from the unloaded powered state to a loaded powered state responsive to the discharge temperature being within a second temperature range for the second length of time.

BRIEF DESCRIPTION OF THE DRAWINGS

The subject matter may be understood from reading the following description of non-limiting embodiments, with reference to the attached drawings, wherein below:

FIG. 2 illustrates a flowchart of one example of a method for a warmup procedure for a compressor of a powered system, in accordance with one embodiment;

DETAILED DESCRIPTION

Figure 1:
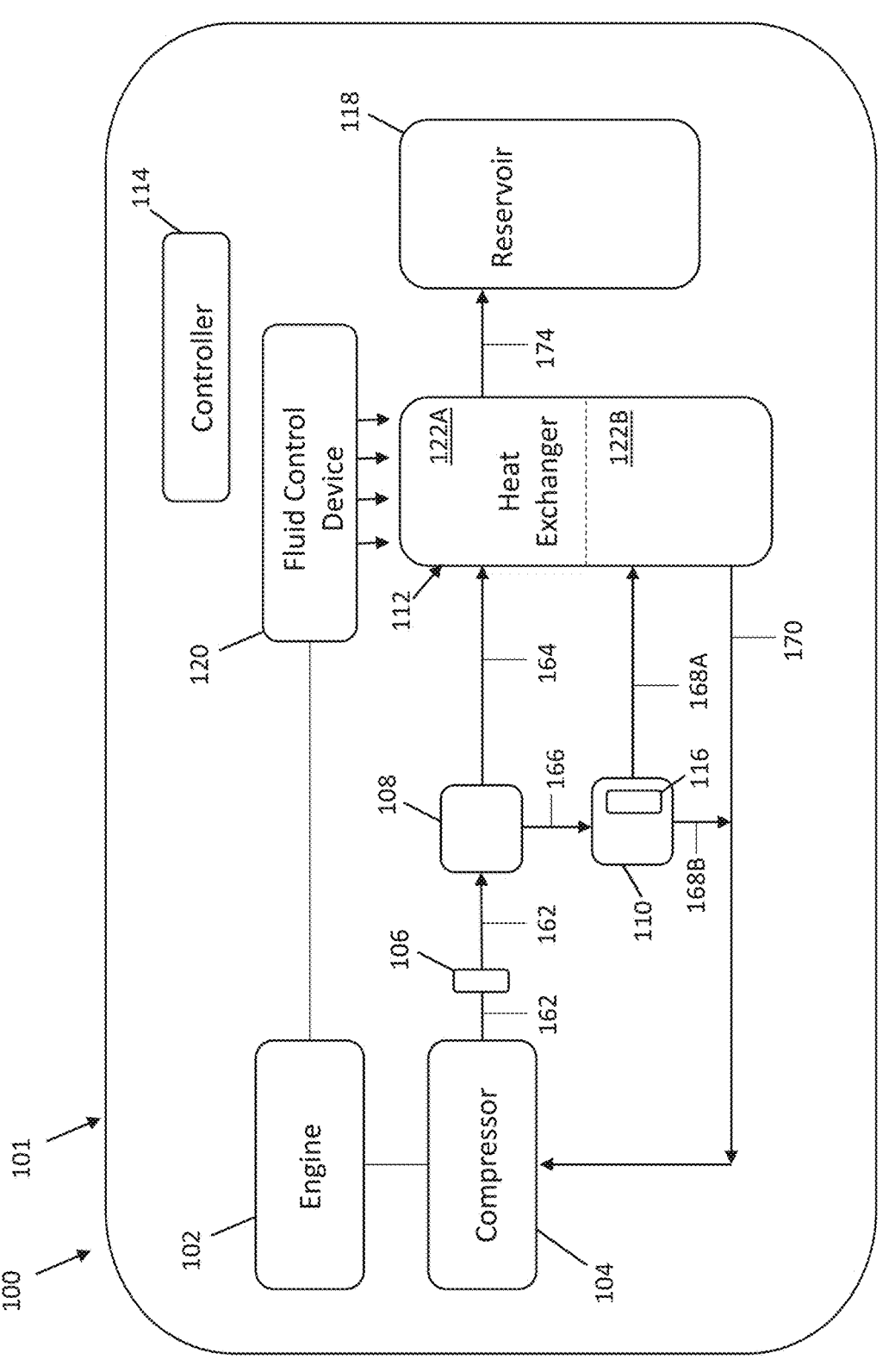
FIG. 1 illustrates a schematic of a powered system, in accordance with one embodiment.

Embodiments of the subject matter described herein relate to a thermal management control system for a powered system (e.g., a vehicle system), a method for monitoring temperatures of the powered system, and a method for controlling operation of the powered system based on the temperatures of the powered system. The powered system may be monitored during one or more operating conditions of the powered system. For example, the thermal management control system may monitor the powered system during startup and/or warmup cycles of one or more systems of the powered system. Additionally, the control system may control operation of the one or more systems of the powered system according to a first procedure based on the temperatures of the powered system during the startup and/or warmup cycles of the one or more systems. If temperatures of one or more systems and/or fluids within the powered system exceed determined temperature thresholds during the warmup cycle, then the thermal management control system may change operation(s) of the powered system, may stop the warmup cycle, or the like. Alternatively, if the temperatures of the systems and/or the fluids within the powered system remain within determined temperature thresholds during the warmup cycle, then the thermal management control system may determine that the warmup cycle is complete, and the systems are ready to be fully operated.

In one or more embodiments, the thermal management control system may monitor the powered system during fully loaded operations of the one or more systems of the powered system (e.g., while the powered system is in a fully-operating mode, outside of the warmup system). The thermal management control system may control operation of one or more systems of the powered system according to a second procedure based on the temperatures of the powered system during the fully-loaded operations of the powered system. For example, if temperatures of one or more systems and/or fluids within the powered system exceed determined temperature thresholds during fully-loaded operation of the powered system, the thermal management control system may change operation(s) of the powered system, may stop operation of the powered system, or the like. Alternatively, if the temperatures of the system and/or the fluids within the powered system remain within the determined temperature thresholds during the fully-loaded operation of the powered system, the thermal management system may determine that the systems and/or components of the powered system are operating correctly and efficiently.

In one embodiment, the thermal management system may be used to control thermal conditions of a powered system. The powered system may be a vehicle system, a mechanical system, an electrical system, a propulsion system, or the like. The vehicle system may be a rail vehicle, an automobile, a truck (with or without a trailer), a bus, a marine vessel, an aircraft, a mining vehicle, an agricultural vehicle, or other off-highway vehicle. Optionally, the thermal management system may be used to control thermal conditions of a stationary or other non-vehicle powered system. The vehicle systems described herein (rail vehicle systems or other vehicle systems that do not travel on rails or tracks) can be formed from a single vehicle or multiple vehicles, and optionally an operating system may extend between two or more of the multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

FIG. 1 illustrates a powered system 100, in accordance with one embodiment. The powered system may be or may be disposed within a vehicle system such as a rail vehicle, an automobile, a truck (with or without a trailer), a bus, a marine vessel, an aircraft, a mining vehicle, an agricultural vehicle, or other off-highway vehicle. Optionally, the powered system may be or may be disposed within a non-vehicle and/or stationary power system such as a wind-powered turbine, manufacturing machinery, power generating systems, or the like.

The powered system includes a controller 114 that represents hardware circuitry having and/or connected with one or more processors, such as one or more microprocessors, field programmable gate arrays, integrated circuits, and/or the like. In one embodiment, the controller can represent an engine control unit.

In one embodiment, the controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the powered system executes that plan to achieve the desired input data to mirror the predicted best outcome scenario. Additionally, the success metric may be a combination of optimized outcomes, which may be weighed relative to each other.

The controller can use this artificial intelligence or machine learning to receive input (e.g., a location or change in location). The controller may receive additional input of the change in operating mode that was selected, such as analysis of noise or interference in communication signals (or a lack thereof), operator input, or the like, which indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

The controller communicates with an engine 102 of the powered system. The engine can be a fuel-consuming engine, such as a diesel engine. Not all embodiments of the inventive subject matter, however, are limited to diesel engines. The engine could represent another type of engine that consumes fuel other than diesel fuel, such as an engine that consumes fuel other than diesel, hydrogen, propane, or the like. In one or more embodiments, the engine may also perform work such as rotating a shaft joined to a generator or alternator (not shown), which cause the generator or alternator to output electric current, that can be stored and/or provided to one or more powered components of the powered system, such as a propulsion system (not shown) and/or an auxiliary system (not shown).

The engine also consumes fuel to perform work, such as rotating a shaft joined to a compressor 104. The compressor may output an output mixture 162 based on the rotation of the shaft connecting the compressor with the engine. The output mixture, including a fluid, such as oil, and compressed air, is directed toward a first valve 108, which may be referred to as an oil separator device. The first valve separates at least some oil 166 of the output mixture from at least some heated compressed air 164. The first valve directs the heated compressed air 164 toward a heat exchanger 112, and the oil 166 toward a second valve 110.

The second valve includes a sensor 116 that senses a temperature of the oil 166 that is directed into the second valve. In one or more embodiments, the second valve may be referred to as a thermostat or thermostat device. The second valve may be in a fully open position, a closed position, or a position therebetween based on the temperature of the oil to control the direction of movement of the oil 166. For example, if the temperature of the oil 166 entering the second valve exceeds a determined threshold (e.g., about 100° F., about 150° F., about 200° F., or the like), the second valve may be in the open position and a first discharge oil 168A (e.g., that exceeds the determined temperature threshold) is directed toward the heat exchanger. In another example, if the temperature of the oil 166 entering the second valve is less than the determined threshold (e.g., about 5° F., about 10° F., about 25° F., about 50° F., or the like), the second valve may be in the closed position and a second discharge oil 168B is directed back toward the compressor. For example, the first discharge oil has a temperature that is greater than the temperature of the second discharge oil. If the temperature of the oil is less than the determined threshold, the temperature of oil does not need to be reduced. Alternatively, if the temperature of the oil is greater than the determined threshold temperature, then the temperature of the oil needs to be reduced. In one or more embodiments, the second valve may be in a partially opened position, such as based on the temperature of the oil 166 being within a determined range. For example, the partially opened second valve may direct the first discharge oil 168A toward the heat exchanger and direct the second discharge oil 168B toward the compressor.

In one or more embodiments, the heat exchanger 112 may include an air-cooler portion 122A and an oil-cooler portion 122B. Alternatively, the powered system may include two different heat exchangers that may be used to separately control temperatures of the compressed air and the oil. The air-cooler portion of the heat exchanger receives the heated compressed air 164 from the first valve, changes the temperature of the heated compressed air, and outputs a reduced-temperature compressed air 174 that is directed to a reservoir 118. The oil-cooler portion of the heat exchanger receives the first discharge oil 168A, changes the temperature of the first discharge oil, and outputs a reduced-temperature oil 170 that is directed back toward the compressor. In one or more embodiments, the reduced-temperature oil 170 may combine with the second discharge oil 168B that is directed back to the compressor. Alternatively, the powered system may have an alternative conduit system that keeps the reduced-temperature oil 170 separated from the second discharge oil 168B as the reduced-temperature oil and the second discharge oil are returned to the compressor.

In one or more embodiments, the powered system may include a fluid control device 120, that can represent a fan, a blower, or the like. The fluid control device may be operably coupled with the engine via a shaft, such that operation of the fluid control device may be based on a speed of rotation of the shaft. The fluid control device directs a fluid toward the heat exchanger, which may exchange thermal energy with the heated compressed air 164 and/or the first discharge oil 168A that are directed through the heat exchanger.

The powered system also includes a thermal management control system 101 that may be used to monitor operation of the compressor and/or the heat exchanger. The thermal management control system includes a temperature sensor 106 that is disposed between the compressor and the first valve. The temperature sensor may detect or otherwise sense a temperature of the discharge mixture 162 and may transmit data associated with the temperature of the discharge mixture to the controller, to an off-board controller (not shown), or the like. The controller may receive the data associated with the temperature of the discharge mixture, and may determine the state of the compressor, the heat exchanger, or one or more components of the powered system. The controller may control operation of the engine, the compressor, the heat exchanger, the fluid control device, or one or more other components of the powered system based on the state of the compressor and/or the heat exchanger.

In one or more embodiments, during a warmup operation of the compressor, the compressor may be monitored and controlled to operate according to a warmup strategy. For example, FIG. 2 illustrates a flowchart 200 of a method for a warmup procedure for a compressor of a powered system, in accordance with one embodiment.

At step 202, while the compressor is in an unpowered and unloaded state, a discharge temperature of a discharge mixture (e.g., a discharge mixture including compressed air and oil) being output by the compressor is monitored, such as by the temperature sensor 106. The temperature sensor may transmit the sensed data to the controller of the powered system, to a controller off-board or separate from the powered system, or the like. The controller monitors the data that is received from the temperature sensor associated with the temperature of the discharge mixture. In one or more embodiments, the powered system may include one or more additional sensors that may sense or detect other characteristics of the discharge mixture (e.g., a flowrate, a volume, or the like).

In one more embodiments, the controller may monitor the temperature of the discharge mixture based on one or more ambient conditions to which the powered system is exposed. For example, the controller may have information associated with an ambient temperature, an ambient humidity, or the like, of an environment surrounding the powered system, and may analyze the temperature of the discharge mixture based at least in part on the ambient conditions of the powered system.

At step 204, a determination is made whether the discharge temperature has reached a first temperature threshold. For example, a warmup cycle of the compressor may not begin until the discharge temperature reaches the first temperature threshold. In one embodiment, the first temperature threshold may be based on the ambient temperature of the environment (e.g., ambient temperature (AT)+a determined temperature limit), based on a determined threshold range (e.g., a determined temperature limit), or the like. For example, the first temperature threshold may be about 10° F. above the ambient temperature (e.g., AT+10° F.), may be about 20° F. above the ambient temperature (e.g., AT+20° F.), may be about 40° F. above the ambient temperature (e.g., AT+40° F.), or the like. As another example, the first temperature threshold may not be based on the ambient temperature, and may be a determined temperature threshold, such as about 50° F., about 60° F., about 70° F., about 80° F., or the like.

In one or more embodiments, if the controller determines that the temperature of the discharge mixture is less than the first temperature threshold, then flow of the method may proceed toward step 206. Alternatively, if the controller determines that the temperature of the discharge mixture is greater than the first temperature threshold, flow of the method returns to step 202, and the controller continues to monitor the discharge temperature of the compressor until the discharge temperature is at least equal to or less than the first temperature threshold.

At step 206, the controller may control operation of the compressor to change the state of the compressor. For example, the compressor may be changed from the unpowered unloaded state (at step 202) to an unloaded powered state at step 206. Optionally, the controller may control a communication device to communicate a command message to an operator of the system to manually change the state of the compressor to the unloaded powered state. Optionally, an off-board controller (not shown) may monitor the temperature of the discharge mixture and may control operation of the compressor to change the state of the compressor to the unloaded powered state based on the temperature of the discharge mixture reaching the first temperature threshold.

At step 208, the controller monitors the discharge temperature of the discharge mixture of the compressor for a first length of time. The first length of time may be about 10 minutes, about 15 minutes, about 30 minutes, or the like. At step 210, a determination is made whether the discharge temperature is within a first temperature range for the first length of time. For example, the first temperature range may be from about 150° F. to about 190° F., about 150° F. to about 175° F., about 140° F. to about 190° F., or the like. If the temperature of the discharge mixture is within the first temperature range for the first length of time (e.g., the first temperature range is about 150° F.-190° F. and the first length of time is 15 minutes, and the measured temperature of the discharge temperature is about 160° F. for about 15 minutes), then flow of the method proceeds toward step 212. Alternatively, if the temperature of the discharge mixture is outside of the first temperature range for the first length of time (e.g., the first temperature range is about 150° F.-190° F. but the measured discharge temperature is about 130° F. after 15 minutes), flow of the method proceeds toward step 214.

At step 212, responsive to the temperature of the discharge temperature being within the first temperature range for the first length of time, the state of operation of the compressor may be changed from the unloaded powered state to a loaded powered state. For example, the warmup procedure or warmup cycle of the compressor may be completed, and the compressor may be used by the powered system for operational use of the powered system. The controller may automatically change the state of the compressor to the loaded powered stated, an off-board controller may automatically change the state of the compressor, the controller and/or the off-board controller may communicate a command message to an operator to manually change the state of the compressor, or the like.

At step 214, responsive to the temperature of the discharge mixture being outside of the first temperature range for the first length of time, a determination is made whether the temperature of the discharge mixture is above or exceeds a maximum threshold. In one or more embodiments, the maximum threshold may be about 190° F., about 200° F., about 215° F., or the like. If the temperature of the discharge mixture is less than the maximum threshold, then flow of the method proceeds toward step 216. Alternatively, if the temperature of the discharge mixture is greater than or exceeds the maximum threshold, flow of the method proceeds toward step 220, and at step 220, operation of the compressor is stopped, and the warmup procedure is stopped. For example, the temperature of the discharge mixture may indicate that the compressor is operating above a maximum temperature threshold, that one or more components of the compressor may be malfunctioning, that one or more other components or systems of the powered system (e.g., the heat exchanger, the fluid control device, or the like) may be malfunctioning, or the like.

In one or more embodiments, an alert may be communicated to an operator of the powered system, to an off-board control system, to other powered systems, or the like, indicating that operation of the compressor has stopped, that the warmup cycle of the compressor has been stopped, that the compressor and/or one or more other systems of the powered system requires maintenance or repair, or the like. For example, if the temperature of the discharge mixture is greater than the maximum threshold, the heat exchanger may be clogged, the fluid control device may not be functioning or may not be functioning correctly, the first and/or second valves may be clogged and/or malfunctioning, or any combination therein.

Returning to step 214, if the temperature of the discharge mixture is less than the maximum threshold, then flow of the method proceeds toward step 216. At step 216, the discharge temperature of the discharge mixture from the compressor is monitored for a second length of time. For example, the second length of time may be about 30 minutes, about 45 minutes, about 60 minutes, about 90 minutes, or the like. At step 218, a determination is made whether the discharge temperature is within the first temperature range for the second length of time. If the temperature is within the first temperature range (e.g., from about 150° F.-190° F.) after the second length of time (e.g., about 60 minutes), then flow of the method proceeds toward step 212. Optionally, if the temperature is outside of the first temperature range but is within a percentage threshold of the first temperature range, then flow of the method may also proceed toward step 212. For example, if the discharge temperature is within about 2% of the first temperature range, is within about 5% of the first temperature range, is within about 10% of the first temperature range, or the like, the controller may determine that the discharge temperature is close enough (e.g., within the determined percentage threshold range) of the first temperature range, and may determine that the compressor is operating correctly.

Alternatively, if the discharge temperature is outside of the first temperature range, and is outside of a determined percentage threshold range, flow of the method proceeds toward step 220, and at step 220, operation of the compressor is stopped, and the warmup procedure is stopped.

Returning to step 212, at step 212, the state of the compressor is changed from the unloaded powered state to the loaded powered state. For example, the warmup procedure or warmup cycle of the compressor may be completed, and the compressor may be used by the powered system for operational use of the powered system. At step 222, the operating setting of the engine may be changed. For example, the operating speed of the engine may be increased. Increasing the operating speed of the engine increases the speed of rotation of the shaft extending between the engine and the compressor. For example, after the warmup procedure is completed, the compressor and/or one or more components of the powered system may still be monitored while the powered system is exposed to non-warmup operating conditions to confirm that the compressor and the powered system is operating correctly.

At step 224, a determination is made whether the discharge temperature of the discharge mixture is still within the first temperature range (e.g., from about 150° F.-190° F.) for a third length of time (e.g., about 15 minutes, about 30 minutes, about 45 minutes, or the like) while the engine is operating at the increased operating speed. If the discharge temperature is still within the first temperature range for the third length of time, then flow of the method proceeds toward step 226, and the warmup cycle is completed, and the compressor and the heat exchanger are expected to operate correctly while the powered system is operating in a full-operational state.

Alternatively, if the discharge temperature is outside of the first temperature range, or if the discharge temperature is greater than the maximum temperature threshold (e.g., about 190° F.) after the third length of time, flow of the method returns to step 220, and operation of the compressor is stopped. In one or more embodiments, an alert may be communicated to an operator of the powered system responsive to the compressor stopping operation.

In one or more embodiments, completing at least some of the warmup procedure steps shown in the flowchart illustrated in FIG. 2 improves a reliability of the compressor to operate correctly while the powered system is operating relative to following an alternative warmup procedure or relative to not following any warmup procedure of the compressor. Additionally, completing at least some of the warmup steps shown in the flowchart illustrated in FIG. 2 reduces a duty cycle of the compressor relative to following an alternative warmup procedure or relative to not following any warmup procedure of the compressor.

Figure 3:
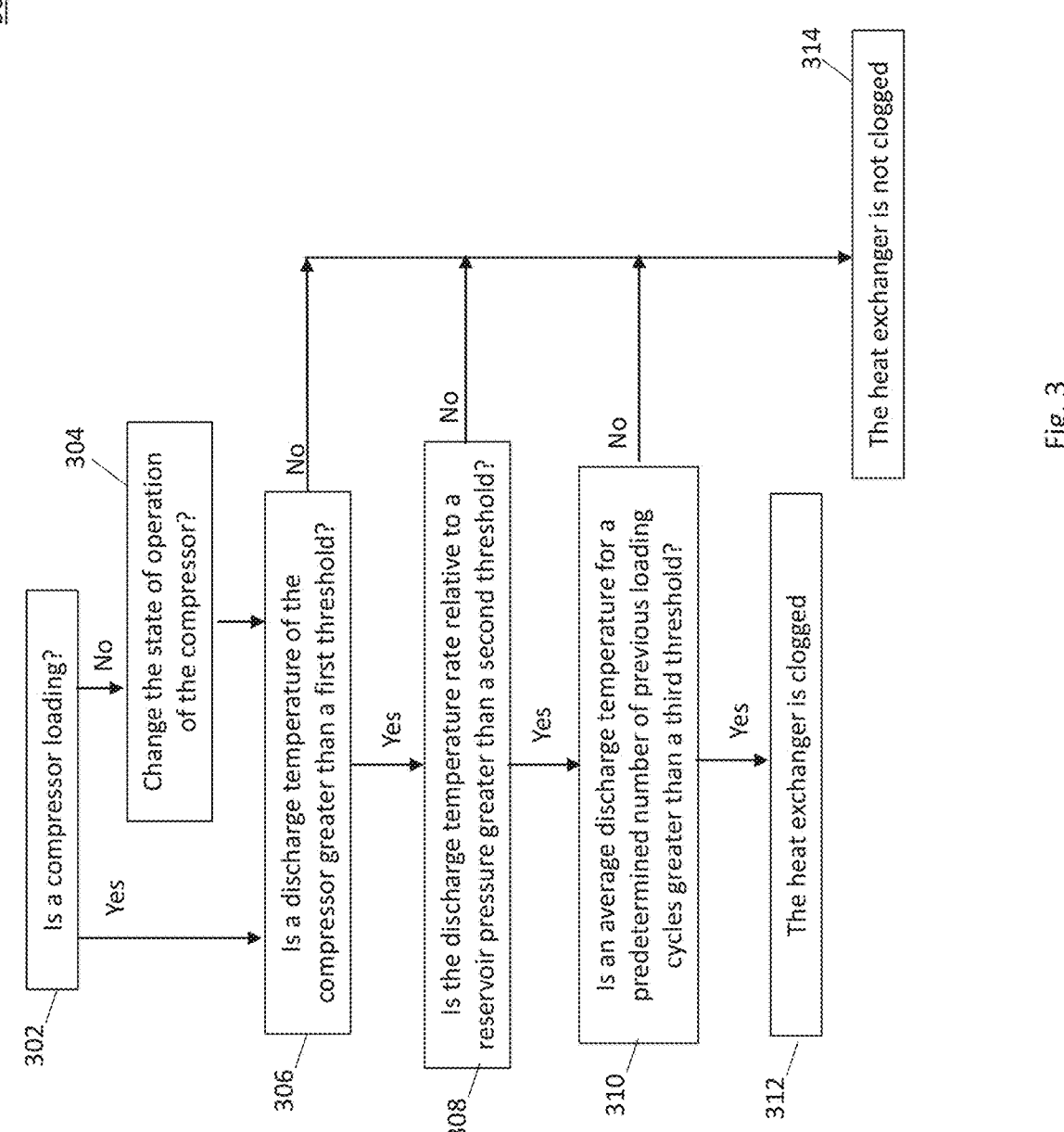
FIG. 3 illustrates a flowchart of one example of a method for monitoring operation of a compressor, in accordance with one embodiment.

After completion of the warmup procedure, the powered system may operate in a fully loaded and/or powered state. While the powered system is operating in the fully loaded and/or fully powered state, the controller may continue to monitor operation of the compressor, of the heat exchanger, and/or one or more other components of the powered system. For example, FIG. 3 illustrates a flowchart 300 of one example of a method for monitoring operation of a compressor, in accordance with one embodiment.

At step 302, a determination is made whether the compressor is loading, or is in a loaded state. If the compressor is loading or in the loaded state, flow of the method proceeds toward step 306. Alternatively, if the compressor is not loaded, or is not in a loaded state, then flow of the method proceeds toward step 304. At step 304, the controller changes the operating setting of the compressor and/or the engine to change the state of operation of the compressor to a loaded state and/or loading state, and flow of the method continues toward step 306.

At step 306, a determination is made whether the discharge temperature of the compressor is greater than a first threshold. For example, the temperature sensor 106 (shown in FIG. 1) may detect or otherwise sense the temperature of the discharge mixture, and may transmit the sensed data to the controller. The controller may determine if the temperature of the discharge mixture is greater than the first threshold. The first threshold may be about 190° F., about 200° F., about 210° F., about 225° F., or the like. If the temperature of the discharge mixture is less than the first threshold, then flow of the method proceeds toward step 314. Alternatively, if the temperature of the discharge mixture is greater than the first threshold, flow of the method proceeds toward step 308.

At step 308, a determination is made whether a discharge temperature rate relative to a reservoir pressure is greater than a second threshold. For example, the discharge temperature rate may be based on the discharge temperature and the speed of rotation of an engine shaft. The discharge temperature rate is a function of the compressor heat, and the compressor heat is a function of a compressor speed, and the compressor speed is a function of the engine speed (e.g., revolutions per minute (rpm) of the engine shaft). The reservoir pressure may be based at least in part on a pressure of a fluid disposed or contained within the reservoir 118 (shown in FIG. 1).

If the discharge temperature rate relative to the reservoir pressure is less than the second threshold, then flow of the method proceeds toward step 314. Alternatively, if the discharge temperature rate relative to the reservoir pressure is greater than the second threshold, then flow of the method proceeds toward step 310.

At step 310, a determination is made whether an average discharge temperature for a predetermined number of previous loading cycles is greater than a third threshold. For example, the controller may review the discharge temperature for plural previous loading cycles and determine an average discharge temperature across the plural previous loading cycles. In one or more embodiments, the controller may review the discharge temperature from the previous 10 loading cycles of the compressor, from the previous 20 loading cycles of the compressor, from the previous 50 loading cycles of the compressor, or the like. If the average discharge temperature across the previous loading cycles is less than a third threshold, then flow of the method proceeds toward step 314. Alternatively, if the average discharge temperature across the previous loading cycles is greater than the third threshold, then flow of the method proceeds toward step 312.

At step 312, responsive to determining that the discharge temperature is greater than the first threshold (e.g., at step 306), that the discharge temperature rate relative to the reservoir pressure is greater than the second threshold (e.g., at step 308), that the average discharge temperature for the predetermined number of previous loading cycles is greater than the third threshold (e.g., at step 310), a determination is made that the heat exchanger is clogged. In one or more embodiments, an alert may be communicated, such as to an operator of the powered system, indicating that the heat exchanger is clogged and requires inspection and/or repair. Optionally, an alert may be communicated to a dispatch center indicating that the heat exchanger is clogged, that the powered system is malfunctioning, that the powered system requires maintenance, or the like. Optionally, the controller may automatically change the operating setting of one or more components or systems of the powered system responsive to determining that the heat exchanger is clogged. For example, the powered system may change the operating setting of the engine to slow or stop movement of the powered system. Optionally, a command message may be communicated to an operator of the powered system to stop operation of the powered system, to manually change an operating setting of the powered system, or the like.

Alternatively, at step 314, responsive to at least one of the discharge temperature being less than the first threshold (e.g., at step 306), the discharge temperature rate relative to the reservoir pressure being less than the second threshold (e.g., at step 308), or the average discharge temperature for the predetermined number of previous loading cycles being less than the third threshold (e.g., at step 310), the controller determines that the heat exchanger is not clogged (e.g., the heat exchanger does not include or includes a minimal amount of debris, of oil, or the like). For example, the controller may determine that the compressor may be operating correctly, that the heat exchanger is cooling the temperatures of the compressed air and the oil to acceptable temperatures, that the amount of debris within the heat exchanger is less than an allowable amount of debris to be present in the heat exchanger, or the like.

Figure 4:
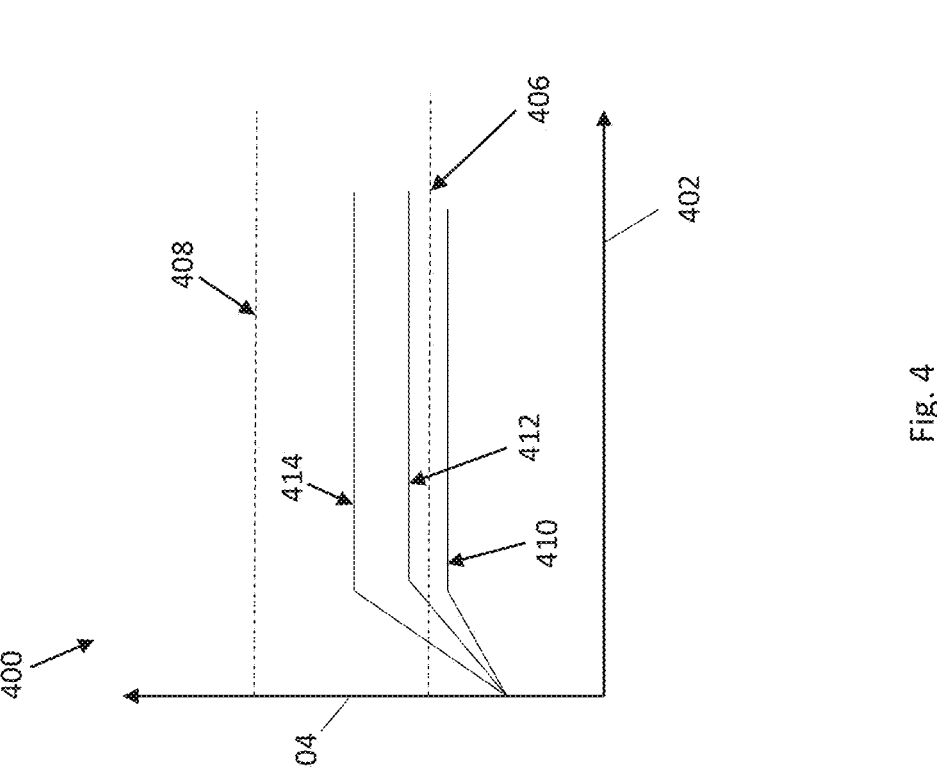
FIG. 4 illustrates a graph for monitoring a discharge temperature of a compressor during operation of the compressor, in accordance with one embodiment.

FIG. 4 illustrates a graph 400 for monitoring a discharge temperature of a compressor during operation of the compressor, in accordance with one embodiment. The graph includes a horizontal axis 402 representative of time, and a vertical axis 404 representative of a discharge temperature of the discharge mixture being output by the compressor. The graph also includes a first threshold 406 (e.g., a minimum threshold value of a determined threshold temperature range) and a second threshold 408 (e.g., a maximum threshold value of the determined threshold temperature range. While the compressor is in the loaded state (e.g., the compressor is continuously loading), the temperature sensor 106 monitors the discharge temperature of the discharge mixture. The graph includes a first data line 410, a second data line 412, and a third data line 414. In the illustrated embodiment of FIG. 4, the first, second, and third data lines indicate that the discharge temperature of the discharge mixture remains within the determined threshold range, or within a percentage limit of the determined threshold range, while the compressor is continuously loading. For example, the data lines indicate that the compressor and the heat exchanger are operating correctly, and the heat exchanger is not clogged. In one or more embodiments, the ambient temperature may change while the compressor is continuously loading. For example, the powered system may be operating in a geographic area that has a greater ambient temperature than another geographic area. As the ambient temperature increases, if the data lines indicate that the discharge temperature remains within the determined threshold range (e.g., between the first and second thresholds 406, 408), then the compressor and/or heat exchanger are determined to be operating correctly and efficiently.

Figure 5:
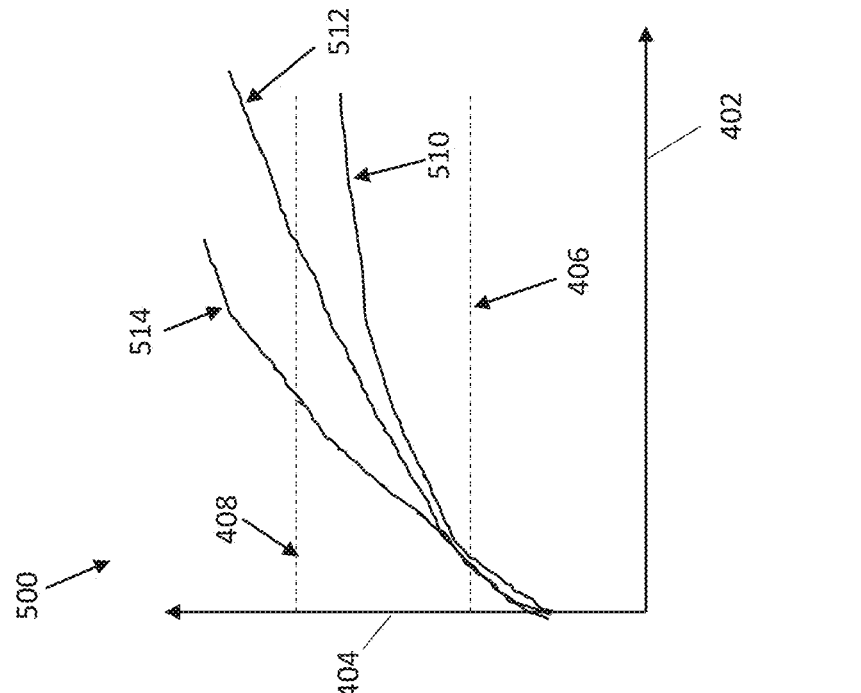
FIG. 5 illustrates a graph for monitoring a discharge temperature of a compressor during operation of the compressor, in accordance with one embodiment.

Alternatively, FIG. 5 illustrates a graph 500 for monitoring the discharge temperature for the compressor while the compressor and/or the heat exchanger are not operating correctly. The graph 500 includes the horizontal axis 402 representative of time, and the vertical axis 404 representative of the discharge temperature of the discharge mixture. The graph 500 also includes the first threshold 406 and the second threshold 408 indicative of the determined threshold temperature range.

While the compressor is in the loaded state (e.g., the compressor is continuously loading), the temperature sensor 106 monitors the discharge temperature of the discharge mixture. The graph includes a fourth data line 510, a fifth data line 512, and a sixth data line 514. In the illustrated embodiment of FIG. 5, the fourth, fifth, and sixth data lines continue to increase (e.g., do not plateau as shown in the first, second, or third data lines shown in FIG. 4) over time, and indicate that the discharge temperature of the discharge mixture eventually exceeds the second threshold 408 (e.g., the maximum threshold value of the determined threshold temperature range). For example, the data lines indicate that the compressor and/or the heat exchanger are not operating correctly, that the compressor and/or the heat exchanger are malfunctioning, and/or that the heat exchanger is clogged (e.g., clogged beyond an acceptable limit).

In accordance with one or more embodiments of the subject matter described herein, a method includes monitoring a discharge temperature of a compressor of a powered system while the compressor is in an unpowered state, and changing the state of the compressor from the unpowered state to an unloaded powered state to start operation of the compressor responsive to the discharge temperature of the compressor reaching a first temperature threshold. The discharge temperature of the compressor is monitored for a first length of time while the compressor operates in the unloaded powered state. The state of the compressor is changed from the unloaded powered state to a loaded powered state responsive to the discharge temperature being within a first temperature range for the first length of time.

Optionally, the method may include changing an operating setting of an engine of the powered system responsive to the discharge temperature being outside of the first temperature range for the first length of time, and monitoring the discharge temperature for a second length of time. Optionally, the method may include changing the state of the compressor from the unloaded powered state to the loaded powered state responsive to the discharge temperature being within a second temperature range for the second length of time. Optionally, the method may include stopping operation of the compressor responsive to the discharge temperature being outside of the second temperature range for the second length of time. Optionally, the method may include communicating an alert responsive to stopping operation of the compressor.

Optionally, the method may include stopping operation of the compressor responsive to the discharge temperature reaching a third temperature threshold. Optionally, the method may include monitoring the discharge temperature of the compressor while the compressor operates in the loaded powered state. Optionally, the method may include communicating an alert responsive to the discharge temperature of the compressor operating in the loaded powered state reaching a fourth temperature threshold. Optionally, the method may include monitoring the discharge temperature of the compressor for a number of cycles of the powered system, and determining an average of the discharge temperature of the compressor while the compressor operates in the loaded powered state for the number of cycles of the powered system. Optionally, the method may include communicating an alert responsive to the average of the discharge temperature of the compressor being outside of a fifth temperature threshold.

In accordance with one or more embodiments of the subject matter described herein, a system includes one or more sensors that sense a discharge temperature of a compressor of a powered system while the compressor is in an unpowered state. One or more processors control operation of the compressor to change the state of the compressor from the unpowered state to an unloaded powered state to start operation of the compressor responsive to the discharge temperature of the compressor reaching a first temperature threshold. The one or more processors monitor the discharge temperature of the compressor for a first length of time while the compressor operates in the unloaded powered state, and the processors change the state of the compressor from the unloaded powered state to a loaded powered state responsive to the discharge temperature being within a first temperature range for the first length of time.

Optionally, the one or more processors may change an operating settings of an engine of the powered system responsive to the discharge temperature being outside of the first temperature range for the first length of time. The processors may monitor the discharge temperature for a second length of time. Optionally, the processors may change the state of the compressor from the unloaded powered state to the loaded powered state responsive to the discharge temperature being within a second temperature range for the second length of time. Optionally, the processors may stop operation of the compressor responsive to the discharge temperature being outside of the second temperature range for the second length of time. Optionally, a communication system may communicate an alert responsive to the one or more processors stopping operation of the compressor.

Optionally, the processors may stop operation of the compressor responsive to the discharge temperature reaching a third temperature threshold. Optionally, the processors may monitor the discharge temperature of the compressor while the compressor operates in the loaded powered state. Optionally, a communication system may communicate an alert responsive to the discharge temperature of the compressor operating in the loaded powered state reaching a fourth temperature threshold. Optionally, the processors may monitor the discharge temperature of the compressor for a number of cycles of the powered system, and the processors may determine an average of the discharge temperature of the compressor while the compressor operates in the loaded powered state for the number of cycles of the powered system.

In accordance with one or more embodiments of the subject matter described herein, a method for controlling operation of a compressor of a powered system includes monitoring a discharge temperature of a compressor of a powered system while the compressor is in an unpowered state. A state of the compressor is changed from the unpowered state to an unloaded powered state to start operation of the compressor responsive to the discharge temperature of the compressor reaching a first temperature threshold. The discharge temperature of the compressor is monitored for a first length of time while the compressor operates in the unloaded powered state. A determination is made whether the discharge temperature is outside a first temperature range for the first length of time. An operating setting of the powered system is changed responsive to the discharge temperature being outside of the first temperature range for the first length of time. The discharge temperature is monitored for a second length of time, and the state of the compressor is changed from the unloaded powered state to a loaded powered state responsive to the discharge temperature being within a second temperature range for the second length of time.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in another device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:

monitoring a discharge temperature of a compressor of a powered system while the compressor is in an unpowered state;

changing a state of the compressor from the unpowered state to an unloaded powered state to start operation of the compressor responsive to the discharge temperature of the compressor reaching a first temperature threshold;

monitoring the discharge temperature of the compressor for a first length of time while the compressor operates in the unloaded powered state; and changing the state of the compressor from the unloaded powered state to a loaded powered state responsive to the discharge temperature being within a first temperature range for the first length of time.

2. The method of claim 1, further comprising:

changing an operating setting of an engine of the powered system responsive to the discharge temperature being outside of the first temperature range for the first length of time; and monitoring the discharge temperature for a second length of time.

3. The method of claim 2, further comprising changing the state of the compressor from the unloaded powered state to the loaded powered state responsive to the discharge temperature being within a second temperature range for the second length of time.

4. The method of claim 2, further comprising stopping operation of the compressor responsive to the discharge temperature being outside of a second temperature range for the second length of time.

5. The method of claim 4, further comprising communicating an alert responsive to stopping operation of the compressor.

6. The method of claim 1, further comprising stopping operation of the compressor responsive to the discharge temperature reaching a third temperature threshold.

7. The method of claim 1, further comprising monitoring the discharge temperature of the compressor while the compressor operates in the loaded powered state.

8. The method of claim 7, further comprising communicating an alert responsive to the discharge temperature of the compressor operating in the loaded powered state reaching a fourth temperature threshold.

9. The method of claim 7, further comprising monitoring the discharge temperature of the compressor for a number of cycles of the powered system; and determining an average of the discharge temperature of the compressor while the compressor operates in the loaded powered state for the number of cycles of the powered system.

10. The method of claim 9, further comprising communicating an alert responsive to the average of the discharge temperature of the compressor being outside of a fifth temperature threshold.

11. A system comprising:

one or more sensors configured to sense a discharge temperature of a compressor of a powered system while the compressor is in an unpowered state; and one or more processors configured to control operation of the compressor to change a state of the compressor from the unpowered state to an unloaded powered state to start operation of the compressor responsive to the discharge temperature of the compressor reaching a first temperature threshold, the one or more processors configured to monitor the discharge temperature of the compressor for a first length of time while the compressor operates in the unloaded powered state, and the one or more processors configured to change the state of the compressor from the unloaded powered state to a loaded powered state responsive to the discharge temperature being within a first temperature range for the first length of time.

12. The system of claim 11, wherein the one or more processors are configured to change an operating setting of an engine of the powered system responsive to the discharge temperature being outside of the first temperature range for the first length of time, wherein the one or more processors are configured to monitor the discharge temperature for a second length of time.

13. The system of claim 12, wherein the one or more processors are configured to change the state of the compressor from the unloaded powered state to the loaded powered state responsive to the discharge temperature being within a second temperature range for the second length of time.

14. The system of claim 12, wherein the one or more processors are configured to stop operation of the compressor responsive to the discharge temperature being outside of a second temperature range for the second length of time.

15. The system of claim 14, further comprising a communication system configured to communicate an alert responsive to the one or more processors stopping operation of the compressor.

16. The system of claim 11, wherein the one or more processors are configured to stop operation of the compressor responsive to the discharge temperature reaching a third temperature threshold.

17. The system of claim 11, wherein the one or more processors are configured to monitor the discharge temperature of the compressor while the compressor operates in the loaded powered state.

18. The system of claim 17, further comprising a communication system configured to communicate an alert responsive to the discharge temperature of the compressor operating in the loaded powered state reaching a fourth temperature threshold.

19. The system of claim 11, wherein the one or more processors are configured to monitor the discharge temperature of the compressor for a number of cycles of the powered system, the one or more processors configured to determine an average of the discharge temperature of the compressor while the compressor operates in the loaded powered state for the number of cycles of the powered system.

20. A method for controlling operation of a compressor of a powered system, the method comprising:

monitoring a discharge temperature of the compressor of the powered system while the compressor is in an unpowered state;

changing a state of the compressor from the unpowered state to an unloaded powered state to start operation of the compressor responsive to the discharge temperature of the compressor reaching a first temperature threshold;

monitoring the discharge temperature of the compressor for a first length of time while the compressor operates in the unloaded powered state;

determining whether the discharge temperature is outside of a first temperature range for the first length of time;

changing an operating setting of the powered system responsive to the discharge temperature being outside of the first temperature range for the first length of time;

monitoring the discharge temperature for a second length of time; and changing the state of the compressor from the unloaded powered state to a loaded powered state responsive to the discharge temperature being within a second temperature range for the second length of time.

* * * * *